April 28, 1970 F. G. POWELL, JR 3,508,314
ROD INSERTION APPARATUS
Filed March 16, 1967 5 Sheets-Sheet 1

INVENTOR
FLOYD G. POWELL, JR.
BY Louis A. Kline
John T. Matlago
Robert L. Harrington
HIS ATTORNEYS

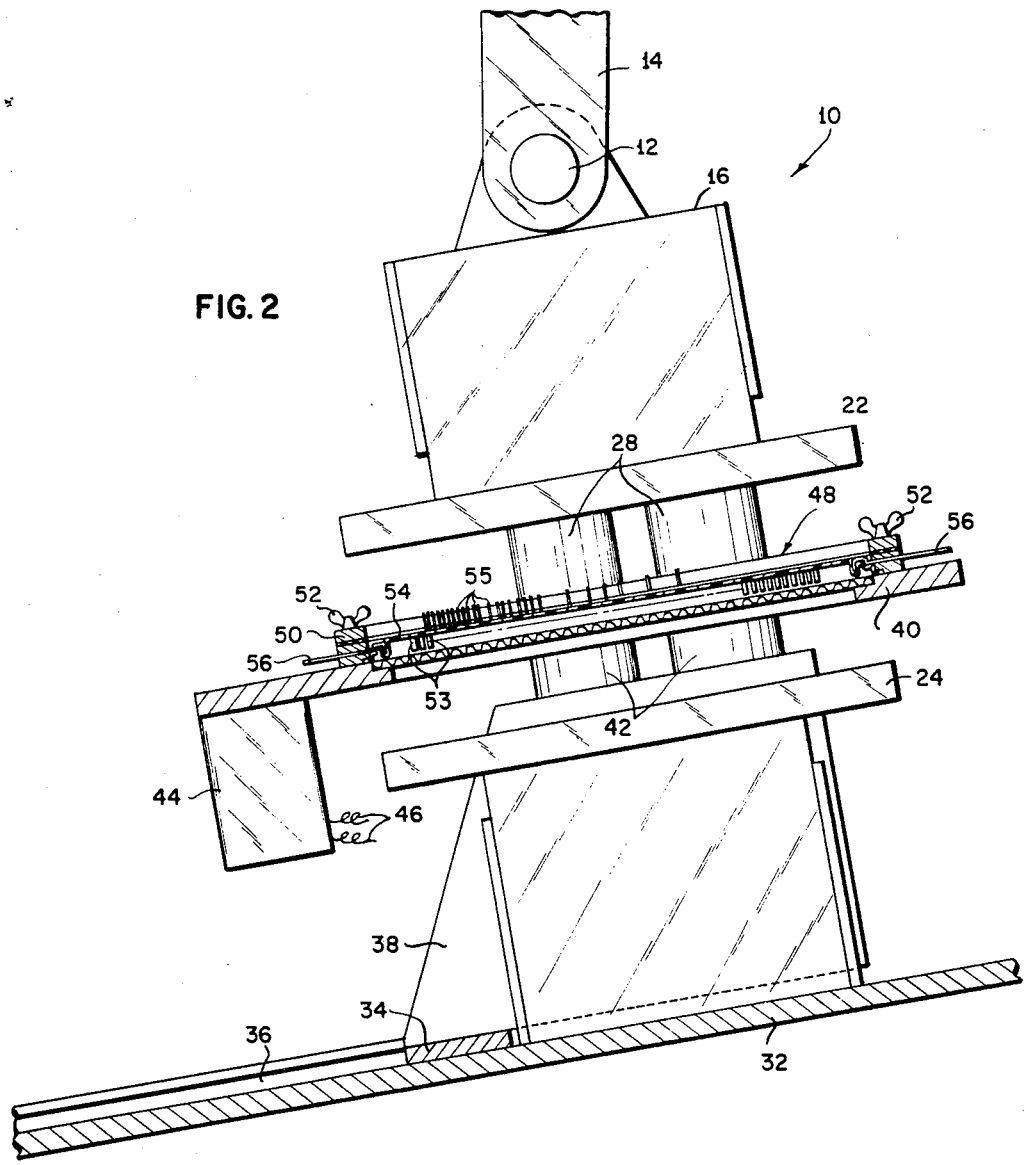

April 28, 1970  F. G. POWELL, JR  3,508,314
ROD INSERTION APPARATUS
Filed March 16, 1967  5 Sheets-Sheet 3

INVENTOR
FLOYD G. POWELL, JR.

BY Louis A. Kline
John J. Maslago
Robert L. Harrington
HIS ATTORNEYS

April 28, 1970     F. G. POWELL, JR     3,508,314

ROD INSERTION APPARATUS

Filed March 16, 1967     5 Sheets-Sheet 4

INVENTOR
FLOYD G. POWELL, JR.

BY
HIS ATTORNEYS

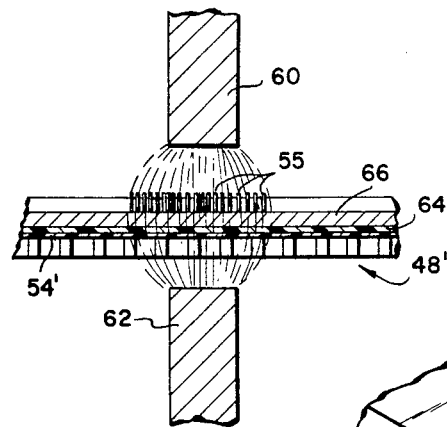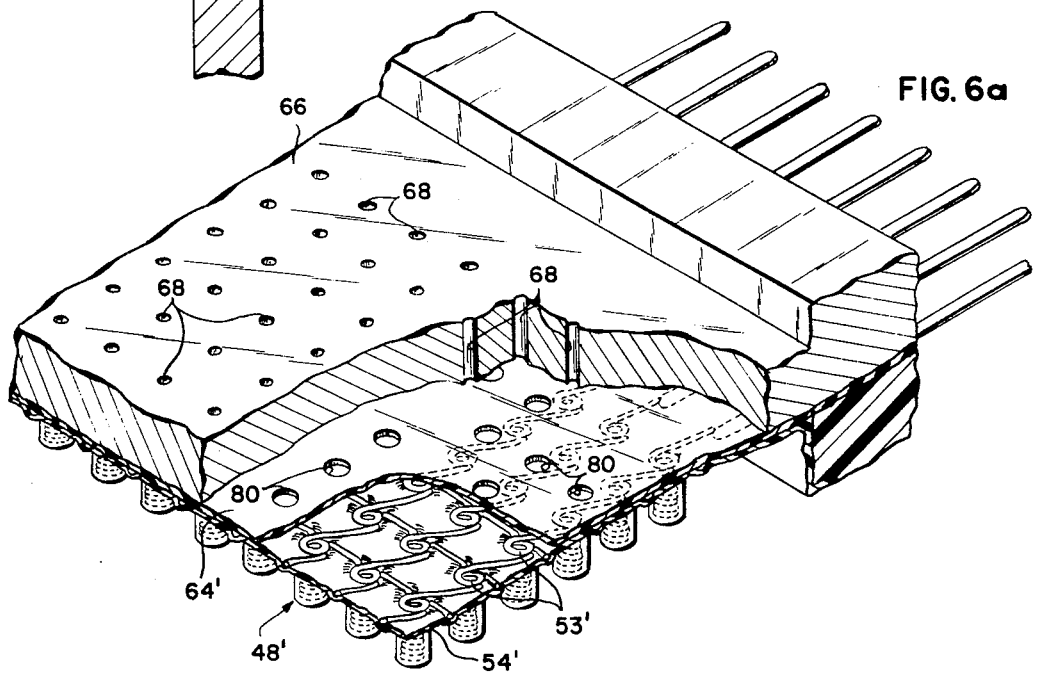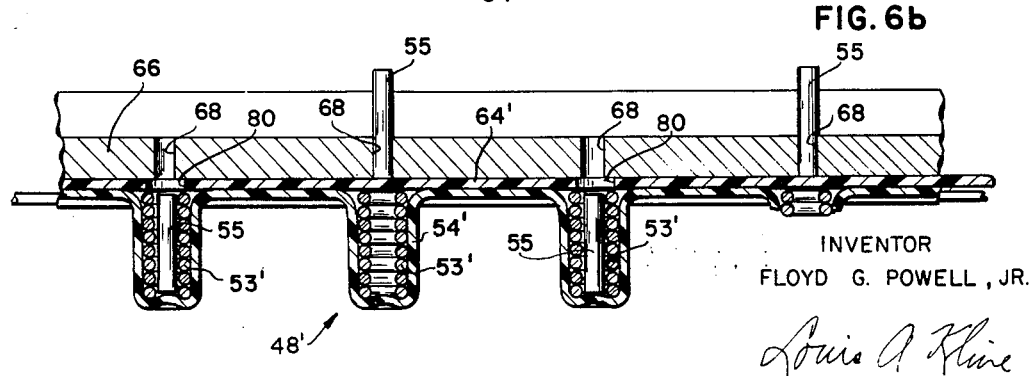

BEST AVAILABLE COPY

United States Patent Office 3,508,314
Patented Apr. 28, 1970

3,508,314
ROD INSERTION APPARATUS
Floyd G. Powell, Jr., Torrance, Calif., assignor to The National Cash Register Company, Dayton, Ohio, a corporation of Maryland
Filed Mar. 16, 1967, Ser. No. 623,757
Int. Cl. H01r 43/04
U.S. Cl. 29—203                                         6 Claims

ABSTRACT OF THE DISCLOSURE

A process and apparatus for inserting small magnetic rods in the open ends of a large number of solenoid coils positioned in a magnetic field with the coils substantially in a plane. An excessive number of the magnetic rods are placed onto the solenoid plane and the solenoid plane is positioned in a magnetic field with the coils substantially aligned with the magnetic lines of force. The magnetic field polarizes the rods to align them with the magnetic lines of force and accordingly, in parallel alignment with the coils. The rods are moved across the plane and are inserted into the solenoid coils as they become positioned over the open ends of the coils.

BACKGROUND OF INVENTION

A solenoid plane such as used in memories for computer systems and the like may have as many as five thousand or more solenoid windings having openings of about .01 inch diameter in which rods on the order of about .1 inch length and .006 inch diameter are to be inserted. A computer memory incorporating such solenoid planes is disclosed in the commonly assigned copending U.S. patent application entitled "Computer Memory Having One Element Per Bit Storage And Two Element Per Bit Noise Cancellation," Ser. No. 530,042, filed in the name of Eduardo T. Ulzurrun.

If any of the tiny rods are in any way damaged during the process of inserting them into the solenoid windings, e.g., as by bending or by piercing through the exterior coatings provided on the rods, the resulting solenoid plane may not operate properly. Heretofore, the only known methods of inserting rods into the solenoid windings included either manual or mechanical handling which frequently damaged the rods. Furthermore, such processes are very tedious and time consuming requiring a worker as much as several days time for the completion of a single solenoid plane. It is accordingly an object of the present invention to provide an improved method for inserting rods into the solenoid windings of a solenoid plane whereby the rods are handled with sufficient speed and care to satisfactorily complete a solenoid plane in a fraction of the time required by such prior manual and mechanical methods.

In general, the preferred embodiment of the invention comprises the steps including (1) providing a substantially vertical magnetic field, as for example, with an electromagnet, (2) supporting a solenoid plane in a substantially horizontal position within the vertical magnetic field, (3) placing an excess number of the rods on the solenoid plane to be polarized by the magnetic field whereby they are aligned with the vertical lines of force, (4) vibrating the rods to reduce the frictional contact between the rods and the solenoid plane, and (5) sweeping the rods back and forth across the plane to enable them to be drawn into the solenoid windings as they become positioned over the open end of the coils. Such sweeping of the rods being accomplished, for example, by passing the plane back and forth through a narrow magnetic field where the rods are magnetically held within the field, or as a further example, by tilting the plane back and forth within a broad magnetic field causing the rods to be gravitationally pulled down the incline of the tilted plane, or as still a further example, a combination of the two.

The invention is more specifically further described in the following detailed description and drawings wherein:

FIG. 2 is a side view of the apparatus of FIG. 1 but showing a solenoid plane positioned within a magnetic field produced by the apparatus;

FIG. 4a is an enlarged view of the portion of the apparatus of FIG. 4 illustrating the operation of the magnetic field produced by the apparatus;

Figure 4:
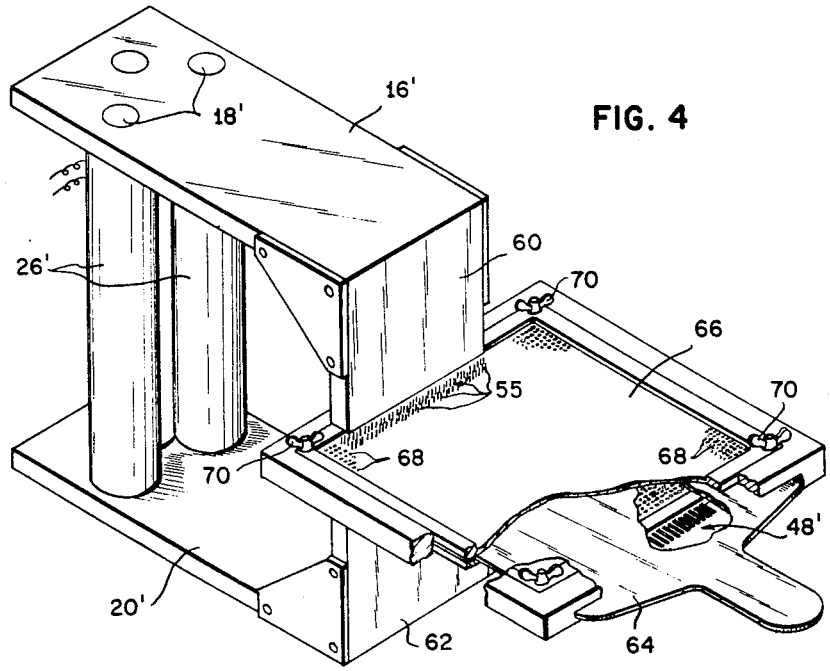
FIG. 4 is a perspective view of an apparatus illustrating a second form of the invention.
Figure 5A:
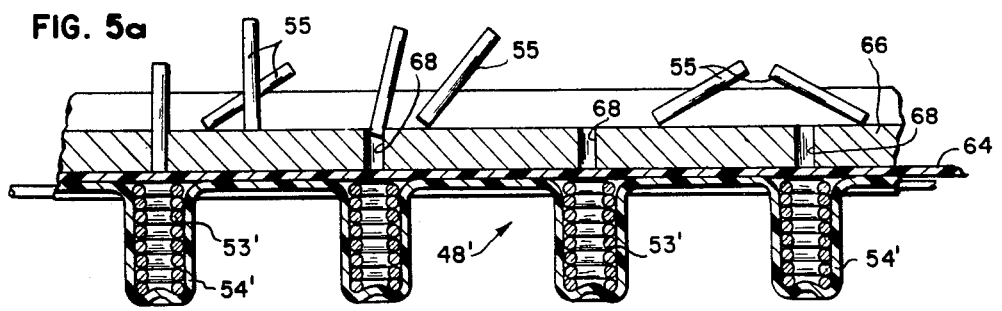
Figure 5B:
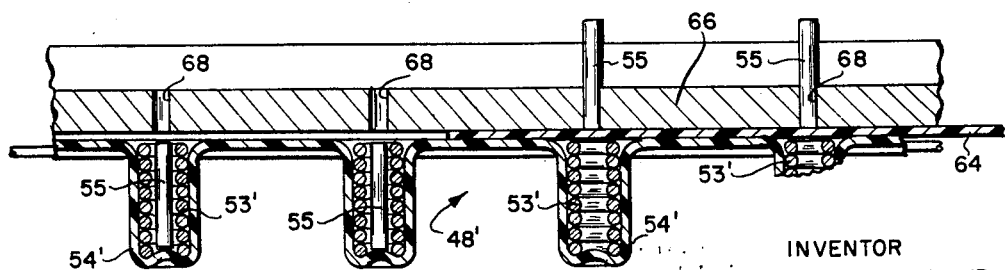

FIGS. 5a and 5b are enlarged views of a portion of a solenoid plane illustrating the method of operating the apparatus of FIG. 4 in inserting rods into the solenoid windings of the solenoid plane; and FIGS. 6a and 6b are enlarged views of a portion of a solenoid plane illustrating an alternative method of operating the apparatus of FIG. 4 in inserting rods into selective solenoid windings of the solenoid plane.

Figure 1:
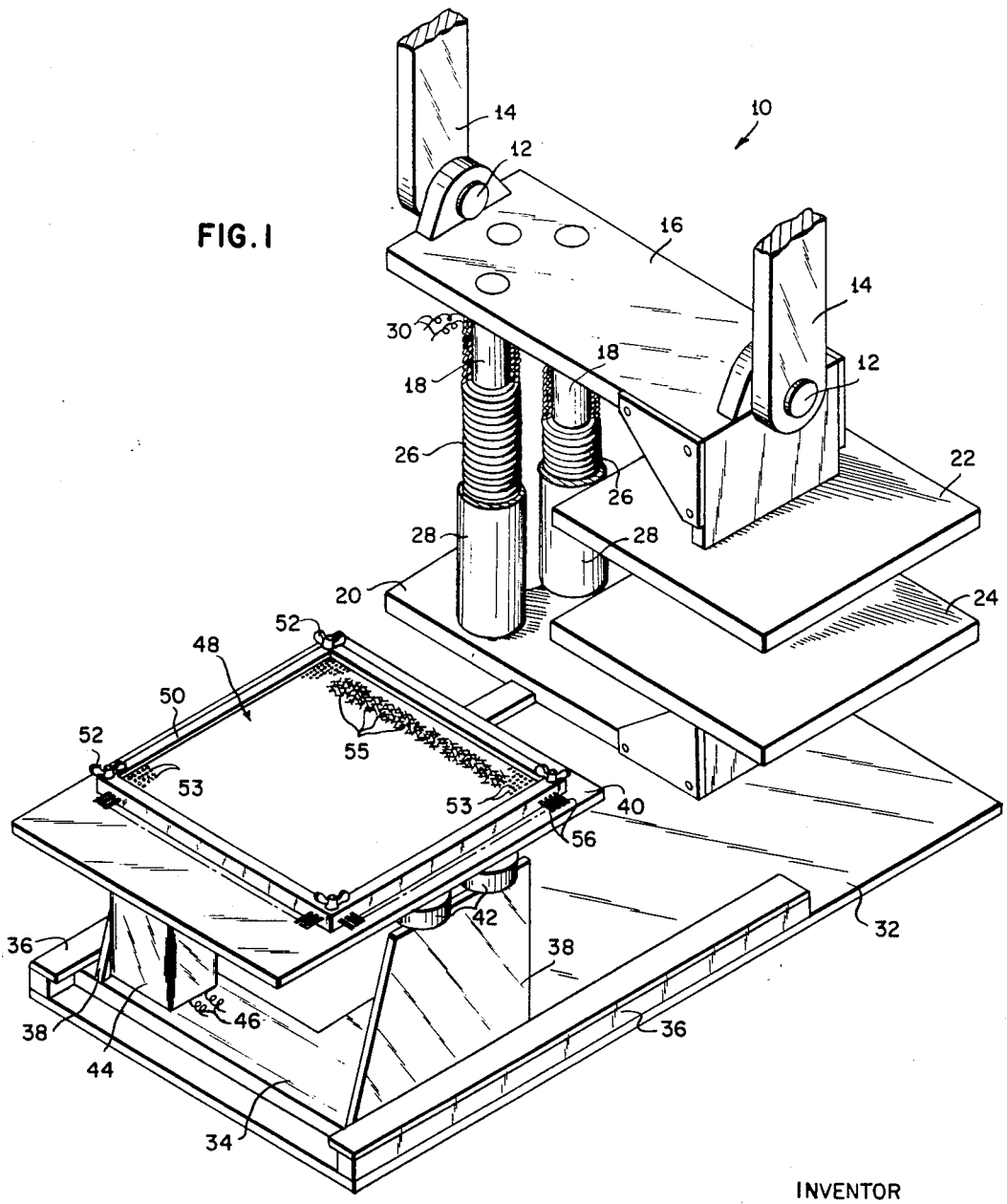
FIG. 1 is a perspective view of an apparatus illustrating one form of the invention.

Referring to FIG. 1, a rod inserting apparatus 10 is pivotally supported by pivotal connections 12 from support bars 14. Apparatus 10 includes an upper brace 16 connected by column support members 18 to a lower brace 20. The upper brace 16 carries an upper plate 22 that is superimposed over and spaced from a lower plate 24 carried by the lower brace 20.

The column support members 18 form the cores of electrical coils 26 having a protective outer wrapping 28. Lead wires 30 provide continuous D.C. electrical current to the coils 26 which establishes electromagnetic polarity in the upper and lower braces 16 and 20 and accordingly, in the upper and lower plates 22 and 24. The polarity sets up a magnetic field between the plates with the magnetic field having substantially vertical lines of magnetic force.

A platform 32 has one end fastened to the lower brace 20 and is extended therefrom parallel to the plates 22 and 24. A carriage unit 34 is slidably mounted on tracks 36 provided on the surface of the platform 32. The carriage unit 34 includes upright members 38. A bed 40 is mounted by rubber mounts 42 to the upright members 38. A vibrator 44 is mounted to the bed 40 which is electrically activated through lead wires 46 to provide vibration to the bed 40.

The bed 40 is adapted to receive a solenoid plane 48, where a holding frame 50 formed around the solenoid plane is secured to the bed 40 by fastening members 52.

OPERATION

Figure 3A:
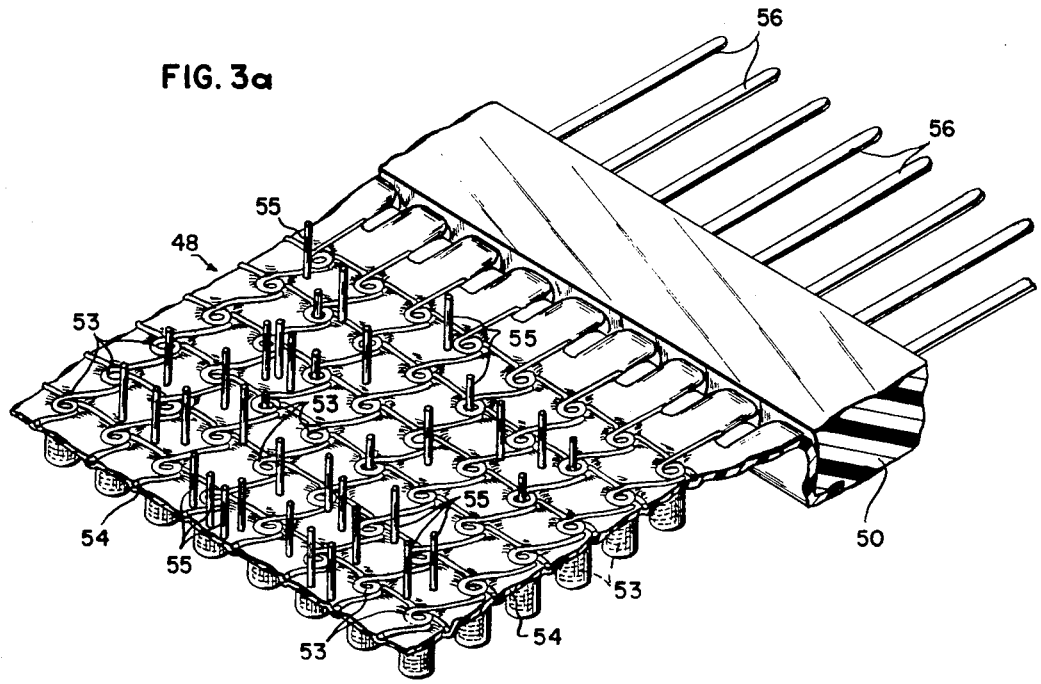
FIG. 3a and 3b are enlarged views of a portion of a solenoid plane illustrating the method of operating the apparatus of FIG. 1 for inserting rods into the solenoid windings of the solenoid plane.
Figure 3B:
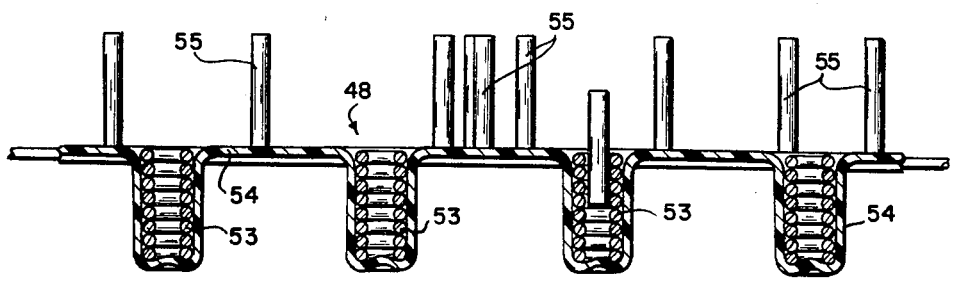

As the carriage unit 34 is slid forward on its tracks 36, the bed 40 with the solenoid plane 48 mounted thereon is moved into the magnetic field between the plates 22 and 24, as illustrated in FIG. 2. A solenoid plane 48 such as contemplated in the present invention and as illustrated in FIGS. 3a and 3b may for example, be comprised of rows and columns of interconnected solenoid coils 53. The coils are embedded in a continuous plastic sheet 54 in a manner whereby one end of the solenoid coils is open with the open ends located in the plane of plastic sheet to form recesses in the otherwise continuous planar surface of the sheet. The other end of the coils is closed by the sheet to prevent the rods 55 from passing through the plane. The frame 50 rigidifies the solenoid plane to facilitate handling, etc. A single solenoid plane may have as many as five thousand or more solenoid coils with the coil openings having a diameter of about .01 inch and with the solenoid rods of about .006 inch diameter and .1 inch length adapted to be inserted into the openings. The solenoid rods are magnetic, i.e., they include in their construction a soft magnetic material. A preferred magnetic rod for the present invention includes a core of inert material, e.g., beryllium copper having a thin magnetic coating of iron nickel. The connecting elements 56 of the solenoid plane provide the means for electrically connecting the solenoid coils to a power source.

As illustrated in FIG. 1, an excess number of solenoid rods 55 are placed on the solenoid plane 48 and the carriage unit 34 is moved forward to position the bed 40 and plane 48 affixed thereto into the magnetic field. The magnetic rods 55 become polarized, thereby causing them to become aligned with the vertical magnetic lines of force of the magnetic field as illustrated in FIG. 2. Activation of the vibrator 44 vibrates the bed 40 and the solenoid plane 48, causing the rods to vibrate on the plane. By pivoting the apparatus 10 on its pivotal connections 12, gravity causes the vibrating rods to move toward the down side of the plane. Thus, by pivoting the plane back and forth, the rods are caused to sweep back and forth on the solenoid plane. In that the surface of the solenoid plane may have irregularities that would tend to hold the rods and resist the gravitational movement of the rods, the vibration is provided to minimize frictional contact and thereby alleviate such resistance. As a rod passes over a solenoid opening, it is gravitationally drawn into the opening. When the solenoid openings are filled, the excess rods are vibrated toward one end and removed from the plane. The plane is then removed from the bed, checked to see that all solenoid coils are properly filled with a rod, and then the plane is coated, e.g., with an adhesive spray, to prevent the rods from falling out in subsequent handling.

SECOND EMBODIMENT

A second embodiment of the invention is disclosed in FIG. 4. An upper brace 16' and lower brace 20' are interconnected by column support members 18'. In the same manner described for the embodiment of FIG. 1, the column support members 18' form the cores for electromagnetic coils 26'. An upper flange 60 depends downwardly from the upper brace 16' and a lower flange 62 extends upwardly from the lower brace 20'. The flanges are aligned and in spaced relation so that a magnetic field is produced within the space between the flanges when the coils 26' are energized.

Referring specifically to FIGS. 5a and 5b, a solenoid plane 48' is constructed in the same manner as described for the first embodiment. In the second embodiment, a removable shutter pad 64 is placed over the solenoid plane, and a magazine 66 is laid over the pad 64. The magazine 66 is provided with openings 68 that are aligned with the solenoid coils 53'. The solenoid plane 48' and magazine 66 are fastened together by fastener members 70, with the shutter pad 64 clamped therebetween (see FIG. 4).

OPERATION

An excess number of rods 55 are placed on the magazine and the composite solenoid plane is manually passed through the magnetic field provided between the two flanges 60 and 62. The magnetic coils 26' are energized by a D.C. electrical power supply that includes means for reversing the direction of current flow to produce oscillating reversal of the polarity at a rate of approximately five cycles per second. Thus, an oscillating magnetic field is produced between the two flanges 60 and 62 whereby the polarity of the magnetic field is being correspondingly reversed. The effect on the rods 55 is to urge the rods to flip over with each reversal of the polarity. In actual practice however, the rods begin to turn but before the turn reaches 90° the polarity of the rod reverses and the rods return to their original standing position. Such oscillation simulates the vibration of the first embodiment and by manually tilting the solenoid plane while moving it back and forth substantially horizontally and transversely to the vertical magnetic lines of force within the magnetic field, the rods are caused to sweep across the magazine 66 to become inserted into the magazine openings 68 as they become positioned over the opening. When all of the magazine holes are filled, the fastening members 70 are loosened and the shutter pad 64 is slid from between the magazine 66 and solenoid plane 48' (e.g., by pulling on tab 72) allowing the rods 55 to fall through the magazine and into the solenoid coils 53'. (See FIG. 5b which illustrates the pad 64 partially removed with certain of the rods 55 being inserted into the plane 48'.)

Several advantages are realized by the use of the magazine 66 and shutter pad 64. First, whereas in some instances the solenoid openings may be large enough to permit two solenoid rods to become jammed into the coil opening, the holes or openings in the magazine can be provided with a sufficiently small diameter to avoid the possibility of more than one rod being inserted therein. Also, the irregularities in the surface of the solenoid plane may be such as to produce problems in sweeping the rods across the plane even with the reduced friction. Placing the rods first into the magazine avoids these problems.

Secondly, it may be desirable to only insert rods into selective solenoid coils, e.g., for producing a read only memory plane. Such use of the magazine and shutter pad is illustrated in FIGS. 6a and 6b. The shutter pad 64' is provided with openings 80 which are programmed to correspond with only selected solenoid coils. The pad is adapted for movement relative to the solenoid plane and magazine, between two positions. In the first position, as shown in FIG. 6a, the holes in the shutter pad 64' are offset from the selected coils of the solenoid plane. Thus, as described above, the rods are initially inserted into the magazine with the shutter pad 64' preventing the rods from passing through and into the solenoid coils. The shutter pad is then moved into a second position where the openings 80 become aligned with the selected coils to permit the rods to drop into those coils. The pad 64' and magazine are then removed and only the selected coils are inserted with rods.

Another variation would be to provide holes in the magazine that would correspond with the selected coils only. However, the holes in the magazine are required to be carefully drilled, making the construction quite expensive. Preparing a different magazine for each desired memory configuration may be prohibitive. The holes in the shutter pads, however, are much less critical and can be drilled oversize without causing any problems. Accordingly, to prepare a plurality of shutter pads is relatively inexpensive.

The above apparatus described for both embodiments incorporate a form of vibration to reduce friction, and in the operation described for both embodiments, sweeping of the rods across the plane is enhanced by tilting the plane. Such details is not intended to limit the scope of the the invention. For example, the magnetic lines of force in a narrow field such as produced in the apparatus of FIG. 4 and illustrated in FIG. 4a, function to resist movement of the rods out of the magnetic field. Thus, if the surface of the solenoid plane is sufficiently smooth so that minimal friction is produced between the rods and the plane, the plane can be passed back and forth through the magnetic field (without tilting) and the rods will be held within the confines of the magnetic lines of force so that the rods will effectively sweep across the plane.

It will be understood that various other omissions, substitutions and changes in the form and details of the device illustrated and in its operation may be made by

What is claimed is:

1. An apparatus for inserting magnetic rods into recesses provided in a plane comprising means for producing a magnetic field having substantially vertical magnetic lines of force, a bed mounted on a frame adapted to be slidably positioned into the magnetic field substantially horizontal to the magnetic lines of force, said frame mounted on a platform, fastening means for mounting the plane onto the bed, means for producing a vibrating motion to vibrate magnetic rods that are placed on the plane, and means for tilting the platform to cause the rods to be gravitationally drawn across the plane.

2. An apparatus for inserting magnetic rods into recesses provided in a plane as defined in claim 1 wherein the magnetic field is produced between substantially horizontally disposed upper and lower plates by a direct current powered electromagnet, said vibration motion produced by a vibrator affixed to the bed, and means for tilting the plates in unison with the tilting of the platform to maintain the relative alignment between the plane and the magnetic field.

3. An apparatus for inserting small magnetic rods into the open ends of a large number of solenoid coils positioned such that the open ends of the coils are located in a plane comprising an electromagnet providing a narrow magnetic field having substantially vertical magnetic lines of force, means for passing a solenoid plane, on which a number of magnetic rods are placed, substantially transversely into and through said magnetic field, said magnetic rods being polarized by the magnetic field and thereby supported by the magnetic lines of force in position for insertion into the coils, and said magnetic lines of force confining the rods within the narrow magnetic field as the plane is passed transversely therethrough to cause the rods to move relative to the plane and become inserted into the coils when positioned thereover, and vibrating means for vibrating the magnetic rods to reduce the frictional contact between the rods and solenoid planes to facilitate relative movement of the rods across the plane.

4. An apparatus for inserting small magnetic rods into the open ends of a large number of solenoid coils positioned such that the open ends of the coils are located in a plane comprising an electromagnet providing a narrow magnetic field having substantially vertical magnetic lines of force, means for passing a solenoid plane, on which a number of magnetic rods are placed, substantially transversely into and through said magnetic field, said magnetic rods being polarized by the magnetic field and thereby supported by the magnetic lines of force in position for insertion into the coils, and said magnetic lines of force confining the rods within the narrow magnetic field as the plane is passed transversely therethrough to cause the rods to move relative to the plane and become inserted into the coils when positioned thereover, and means for vibrating the magnetic rods, said means providing a vibrating motion by reversing the direction of current to the electromagnet to reverse the polarity of the magnetic field whereby the rods are caused to oscillate between a position aligned with the magnetic lines of force and a position angular to said alignment.

5. The apparatus in accordance with claim 3 including a shutter pad, a magazine, thereon having a plurality of said magnetic rods thereon, and means for providing a unified assemblage including said solenoid plane, the shutter pad placed over the solenoid plane and the magazine placed over the shutter pad, said means for passing said solenoid plane adapted for passing said unified assemblage, on which said number of magnetic rods are placed, substantially transversely into and through said magnetic field, said magazine having openings to receive said magnetic rods that are aligned by said magnetic field with the solenoid coils, and means for removing the shutter pad from between the solenoid plane and magazine while maintaining the aligned relationship between the magazine openings and solenoid coils to permit transfer of rods contained in said openings to the solenoid coils.

6. An apparatus in accordance with claim 5 wherein the shutter pad is provided with openings programmed to permit transfer of magnetic rods from the magazine openings to selected ones only of the solenoid coils when said shutter pad is moved to a retracted position.

References Cited

UNITED STATES PATENTS

| | | | |
|---|---|---|---|
| 2,510,555 | 6/1950 | Christie. | |
| 3,061,919 | 11/1962 | Tack | 29—428 |
| 3,241,222 | 3/1966 | Timmermans | 29—203 |
| 3,276,854 | 10/1966 | Felker et al. | 29—203 X |
| 3,370,350 | 2/1968 | Logan | 29—606 |

JOHN F. CAMPBELL, Primary Examiner

C. E. HALL, Assistant Examiner

U.S. Cl. X.R.

29—211, 604; 214—1; 114; 294—65.5